US012619563B2

(12) United States Patent
Zhang

(10) Patent No.: US 12,619,563 B2
(45) Date of Patent: May 5, 2026

(54) DYNAMIC RANDOM-ACCESS MEMORY (DRAM) CONFIGURED FOR BLOCK TRANSFERS AND METHOD THEREOF

(71) Applicant: SUNRISE MEMORY CORPORATION, San Jose, CA (US)

(72) Inventor: Weidong Zhang, San Ramon, CA (US)

(73) Assignee: SUNRISE MEMORY CORPORATION, San Jose, CA (US)

( * ) Notice: Subject to any disclaimer, the term of this patent is extended or adjusted under 35 U.S.C. 154(b) by 105 days.

(21) Appl. No.: 18/365,793

(22) Filed: Aug. 4, 2023

(65) Prior Publication Data

US 2024/0086346 A1 Mar. 14, 2024

Related U.S. Application Data

(60) Provisional application No. 63/375,004, filed on Sep. 8, 2022.

(51) Int. Cl.
*G06F 13/16* (2006.01)
*G06F 13/40* (2006.01)

(52) U.S. Cl.
CPC ...... *G06F 13/1689* (2013.01); *G06F 13/1657* (2013.01); *G06F 13/4022* (2013.01)

(58) Field of Classification Search
CPC ............. G06F 13/1689; G06F 13/1657; G06F 13/4022
USPC ........................................................ 711/154
See application file for complete search history.

(56) References Cited

U.S. PATENT DOCUMENTS

| | | | | |
|---|---|---|---|---|
| 4,956,768 A | * | 9/1990 | Sidi | H04H 20/38 |
| | | | | 710/53 |
| 2002/0163848 A1 | * | 11/2002 | Grasso | G11C 7/1018 |
| | | | | 365/230.03 |
| 2004/0088393 A1 | * | 5/2004 | Bullen | H04L 41/0663 |
| | | | | 709/223 |
| 2005/0120146 A1 | * | 6/2005 | Chen | G06F 13/28 |
| | | | | 710/22 |
| 2005/0151746 A1 | * | 7/2005 | Ford | H04N 21/426 |
| | | | | 348/E9.037 |
| 2006/0090017 A1 | * | 4/2006 | Kim | G06F 13/1684 |
| | | | | 710/22 |
| 2007/0274681 A1 | * | 11/2007 | Andolph | G11B 27/105 |
| 2009/0083500 A1 | * | 3/2009 | Burchard | G06F 13/1673 |
| | | | | 711/E12.001 |

(Continued)

OTHER PUBLICATIONS

Wong et al., "DRAM Caching," Department of Computer Science and Engineering, University of Washington Seattle, Wa 98195-2350, 22 pages.

(Continued)

*Primary Examiner* — Arpan P. Savla
*Assistant Examiner* — Sidney Li

(57) ABSTRACT

A method and system for building a block data transfer (BT) DRAM provides a solution to fix the performance gap between memory and processor. The data conversion time per word between the analog circuits and the digital circuits inside the BT DRAM is smaller than the processor clock cycle time, that enables the average data transfer speed of a BT DRAM to match to the operation speed of a processor. When continuously transferring a plurality of data blocks, a BT DRAM can achieve a close-to-zero-latency performance and is completely self-refreshing.

9 Claims, 7 Drawing Sheets

(56) References Cited

U.S. PATENT DOCUMENTS

2017/0228192 A1* 8/2017 Willcock ............. G06F 3/0604

OTHER PUBLICATIONS

Hegde et al. "VL-CDRAM: Variable Line Sized Cached DRAMs, "Micro Systems Design Lab The Pennsylvania State University, University Park, pp. 132-137.
Micron Technology, DDR5 SDRAM, 2020, 529 pages.
Micron Technology, DDR4 SDRAM, 2018, 372 pages.
Stuechel et al., "Elastic Refresh: Techniques to Mitigate Refresh Penalties in High Density Memory," Electrical & Computer Engineering Department The University of Texas at Austin, Austin, TX, USA, 10 pages.
Bhati, et al., "DRAM Refresh Mechanisms, Penalties, and Trade-Offs" IEEE Transactions On Computers, vol. 64, 2015, 14 pages.
Wulf et al., "Hitting the Memory Wall: Implications of the Obvious," Department of Computer Science University of Virginia, Dec. 1994, 5 pages.
Micron Technology, NAND Flash Memory, 168 pages, 2010.
Wikipedia, "Memory timings," Posted by Alex Watson, possibly repost from original content (Nov. 27, 2007). "The life and times of the modern motherboard" Dec. 23, 2016, 3 pages.
Micron Technology, Technical Note, NAND Flash Performance Increase with Program Page Cache Mode Command, 2006, 7 pages.

* cited by examiner

ACCESS COMMANDS

ADDRESS

CLOCK

ACCESS CONTROLLER
500

DRAM ARRAY
300

CACHE ARRAY A
100

CACHE ARRAY B
200

I/O DRIVER
400

N BITS DATA

1000

DYNAMIC RANDOM-ACCESS MEMORY (DRAM) CONFIGURED FOR BLOCK TRANSFERS AND METHOD THEREOF

CROSS REFERENCE TO RELATED APPLICATIONS

This patent application claims priority to U.S. provisional patent application, Ser. No. 63/375,004, entitled "DYNAMIC RANDOM-ACCESS MEMORY (DRAM) CONFIGURED FOR BLOCK TRANSFERS AND METHOD THEREOF," filed Sep. 8, 2022, which is incorporated herein by reference for all purposes.

BACKGROUND OF THE INVENTION

1. Field of the Invention

The present invention relates to memory systems, including those built out of integrated circuits. In particular, the present invention relates to a dynamic random-access memory (DRAM) system that is configured for block data transfers.

2. Discussion of the Related Art

In the article "Hitting the Memory Wall: Implications of the Obvious," by W. Wulf et al., published in ACM SIGARCH Computer Architecture, News, Volume 23 Issue 1, March 1995, pp. 20-24 (at https://doi.org/10.1145/216585.216588), the authors reviewed a "processor-memory performance gap":

"[T]he rate of improvement in microprocessor speed exceeds the rate of improvement in DRAM memory speed, each is improving exponentially, but the exponent for microprocessors is substantially larger than that for DRAMs. The difference between diverging exponentials also grows exponentially; so, although the disparity between processor and memory speed is already an issue, downstream someplace it will be a much bigger one . . . . Even if we assume a cache hit rate of 99.8% and use the more conservative cache miss cost of 4 cycles as our starting point, performance hits the 5-cycles-per-access wall in 11-12 years. At a hit rate of 99% we hit the same wall within the decade, and at 90%, within 5 years. Note that changing the starting point the currant miss/hit cost ratio m and the cache miss rates don't change the trends: if the microprocessor/memory performance gap continues to grow at a similar rate, in 10-15 years each memory access will cost, on average, tens or even hundreds of processor cycles. Under each scenario, system speed is dominated by memory performance."

The authors' prediction has become a reality. For example, in a state-of-the-art system, a 4.0 GHz processor executes one cycle in 0.25 ns, but when it accesses a data from the main memory, it needs to spend over 40 ns or 160 cycles to complete. Thus, the processor-memory performance gap is huge. Over the years, even though system designs continuously made progress, which included (i) three or more levels of caches—colloquially referred to as Level-1, Level-2, Level-3, . . . , and LLC ("Last Level Cache")—with increasing capacities to improve the hit rate, and (ii) improved industry standard DRAM interfaces (e.g., DDR2, DDR3, DDR4, DDR5 SDRAM, and HBM interfaces) with higher data transfer rates and greater bandwidths, the processor-memory performance gap keeps increasing.

With AI (Artificial Intelligence) and HPC (High Performance Computing) applications, today's microprocessors (e.g., multi-core CPUs and GPUs) require even greater amount of data transferred to and from the main memory. This processor-memory performance gap, also referred to as the "memory wall," has become the main obstacle to performance improvement in today's computer systems.

Thus, there is a long-awaited need for a memory technology whose performance can scale with the processor's performance.

SUMMARY

According to one embodiment of the present invention, a block data transfer (BT) memory system having a system interface and operated by a clock signal, includes: (a) two cache arrays each configured to hold one or more data blocks each of a predetermined number ("block size") of data words; (b) an input/output circuit configured for transferring a data block between a designated one of the cache arrays and the system interface in a system transfer operation, wherein the input/output circuit transfers one or more data words of the data block within each cycle of the clock signal; (c) a memory array configured for storing multiple data blocks, such that one or more data blocks are transferable between the memory array and either one of the cache arrays in a memory transfer operation within an access time of the memory array; and (d) an access controller, configured for controlling both system transfer operations and memory transfer operations, wherein the access controller being configured to designate which one of the cache arrays to be the designated cache array and to cause a plurality of system transfer operations—equal in number or greater in number than the integer multiple—simultaneously with a memory transfer operation between the memory array and the cache array other than the designated cache array. Each set of system transfer operations concurrently carried out with a memory transfer operation may have a duration greater than the memory array access time. In one embodiment, the duration is greater than the memory access time by less than one clock cycle of the clock signal.

According to one embodiment, the block size is a parameter that may be configured by an external processor using access commands over the system interface.

According to one embodiment of the present invention, the memory array may be organized as memory banks. Each memory bank, for example, may be formed by multiple subarrays of memory cells, with subarrays in the same bank being configured to participate in a memory transfer operation simultaneously.

According to one embodiment, each cache array of the memory system may include one or more 2-dimensional arrays of storage cells, each 2-dimensional array organized into rows and columns. The number of rows in each cache array may equal the block size and the number of columns in each cache array may equal the bus width of a word. Each 2-dimensional array may form a data section that is configured to provide a data block in a system transfer operation independently of other data sections.

According to one embodiment of the present invention, the access controller further includes a refresh control circuit that carries out refresh operations in the memory array without participation by an external agent over the system interface.

According to one embodiment of the present invention, the access controller may configure the two cache arrays into a pipeline for carrying out successive system transfer operations involving multiple data blocks.

According to one embodiment of the present invention, the memory system may include more than two cache arrays, such that more data blocks at independent addresses can be transferred and stored in the cache arrays.

According to one embodiment, the access controller implements in each of the cache arrays a write-back policy in which a data block transferred into the cache array by system transfer operations is only transferred into the memory array by a memory transfer operation initiated by the access controller. That memory transfer may occur at any time, with no predetermined schedule, after the system transfer operations are complete.

According to one embodiment of the present invention, a multi-port memory system may be configured as components out of one or more of the memory systems of the present invention using a connection switch hub (e.g., a multiplexer array, a tri-state buffer array or a combination thereof) that integrates the component memory systems. In one embodiment, the connection switch hub is configurable to allow the access controller of a first component memory system to control the memory transfer operations in the memory array of the second component memory system.

These and other advantages, aspects, and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the FIGS. are not necessarily to scale.

DETAILED DESCRIPTION OF THE PREFERRED EMBODIMENTS

Figure 1:
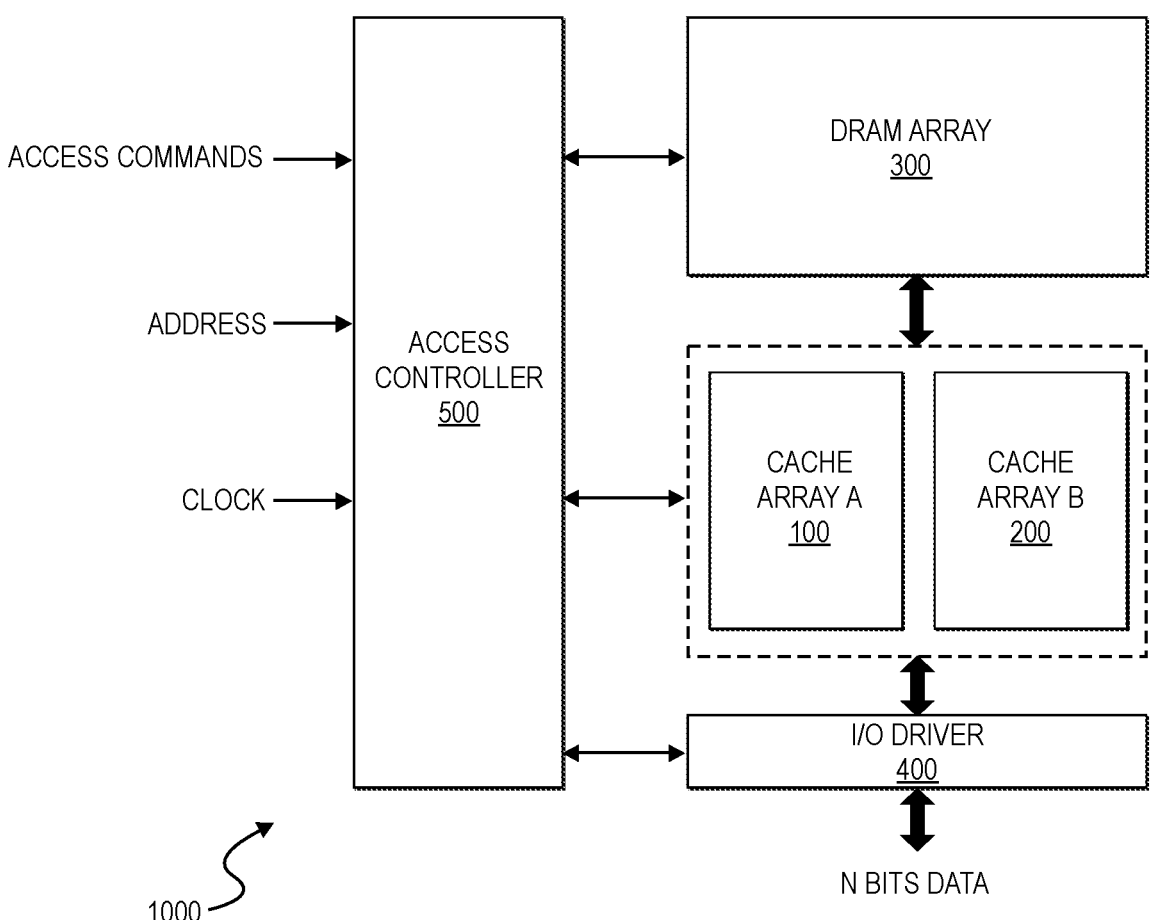
FIG. 1 is a block diagram, which shows an illustrative architecture of BT-DRAM system 1000, in accordance with one embodiment of the present invention.

In this detailed description, process steps described for one embodiment may be used in a different embodiment, even if the process steps are not expressly described in the different embodiment. When reference is made herein to a method including two or more defined steps, the defined steps may be carried out in any order or simultaneously, except where the context dictates, or specific instruction otherwise are provided herein. Further, unless the context dictates or express instructions otherwise are provided, the method may also include one or more other steps carried out before any of the defined steps, between two of the defined steps, or after all the defined steps.

The present invention provides a DRAM system configured for block data transfers during read and write operations ("BT-DRAM system"), the methods disclosed in this invention for block data transferring may also be applied in other memory systems (e.g., SRAM, EPROM, NAND Flash, NOR Flash, MRAM, ReRAM, etc.). According to one embodiment of the present invention, the BT-DRAM system may include a DRAM array, two cache arrays, an input or output (I/O) driver and an access controller. Each DRAM array access may require $M_m$ processor clock cycles. The two cache arrays of the BT-DRAM system may each be organized as a two-dimensional (M×N) array of memory cells, where N is the width of a memory word, by convention, and M is the total number of memory words in each cache array. Data transfers between each cache array and the DRAM array are in blocks of M×N bits. Each cache array is configured to transfer to or from the I/O driver at a rate of one memory word each processor clock cycle, so that M processor clock cycles are required to transfer a M×N-bits data block. In some embodiments, where M is greater than twice $M_m$, the two cache arrays can be pipelined to transfer multiple data blocks to or from the I/O drivers without stalling, and even with enough time to allow for simultaneous refresh operations to take place in the DRAM array. That is, the DRAM array can be completely self-refreshed, without any external intervention.

In accordance with the present invention, for both a reading and a writing operation, the BT-DRAM system takes $(M_m+M*n)$ clock cycles to transfer n data blocks between the I/O driver and the DRAM array, given that one processor clock cycle time is $T_c$, the average data transfer time per memory word $T_w$ is given by:

$$T_w = \frac{(M_m + M*n)*T_c}{M*n} = T_c + \frac{M_m}{M*n}*T_c$$

Therefore, where $M \geq 2*M_m$ and $n \geq 1$, $T_w$ is between one $T_c$ and one and a half times $T_c$, the average data transfer speed of the BT-DRAM system can scale with the processor speed. Furthermore, when implementing the double data rate method in the I/O driver, the average data transfer time per word $$T_w',$$

(where $$T_w' = \frac{1}{2}T_w$$

and block size M'=M*2), will be between a half $T_c$ and three quarters $T_c$. Likewise, when implementing the quad data rate method in the I/O driver, the average data transfer time per word $$T''_w,$$

(where $$T''_w = \frac{1}{4}T_w$$

and block size M"=M*4), will be between a quarter $T_c$ and three eighths $T_c$, the average data transfer speed of the BT-DRAM system will be faster than a processor's speed.

In a BT-DRAM system of the present invention, the memory circuits within the DRAM array need to meet a determining factor $T_{ad}$, which measures the data conversion time per word between the analog circuits and the digital circuits inside the DRAM array, given by:

$$T_{ad} = \frac{\text{Array Access Cycle Time}}{\text{Number of Words per Access}}$$

To make a BT-DRAM system speed matches the processor speed, $T_{ad}$ needs to be less than the processor clock cycle time. This rule should also apply to other high performance memory systems.

In this detailed description, the present invention is illustrated by the example of a 32 Gb BT-DRAM system having a 16M×128×16-bits logical configuration, 16M is the address space of the BT-DRAM memory, 128 is the default data block size, and 16-bits is the I/O data bus width of one word. The DRAM array is physically organized into 32 subarrays, divided into two banks, with each subarray having 128K rows and 8192 columns. The timing parameters CL-RCD-RP of the DRAM array are 18-18-18, the operating clock cycle time $T_c$ is 0.75 ns. The access cycle time of the BT-DRAM system (i.e., the time require to read or write a data block, 128 words) in this embodiment is 96 ns. As would be apparent to those of ordinary skill in the art, this example is provided merely for illustrative purpose; BT-DRAM systems of other sizes and different configurations may also be built and operated without departing from the scope of the present invention.

FIG. 1 is a block diagram that shows an illustrative architecture of BT-DRAM system 1000, in accordance with one embodiment of the present invention. As shown in FIG. 1, BT-DRAM system 1000 includes Cache Array A 100, Cache Array B 200, DRAM array 300, I/O Driver 400 and Access Controller 500. From an external device, the access controller 500 receives access commands (e.g., read and write commands), each associated with a memory address, then generates therefrom internal signals to control the cache array A 100, the cache array B 200, the DRAM array 300 and the I/O driver 400 to input or output a N-bits data. The data and control signals are synchronized to the external clock signal.

Cache array A 100 and Cache Array B 200 may be implemented identically, each cache array may have a continuous address space, in which each row of the cache array is addressable and accessible by the I/O driver 400 for reading or writing a memory word each cycle of the external clock signal.

To carry out a write access command, the memory words of a data block are sequentially received by I/O driver 400 into a designated one of cache array A 100 and cache array B 200 at the rate of one memory word per cycle of the external clock signal. After all memory words of the data block are stored in designated cache array, the memory words of the data block are simultaneously transferred to DRAM array 300 in one memory array access operation.

To carry out a read access command, all the memory words of a data block are read from DRAM array 300 into a designated one of cache array A 100 and cache array B 200 simultaneously in one memory array access operation. Thereafter, a memory word is retrieved from the designated cache array to I/O driver 400 per cycle of the external clock signal. I/O driver 400 output one memory word each cycle of the external clock signal to the external device.

Cache array A 100 and Cache array B 200 may be configured to work cooperatively in parallel. For example, when a data block is transferred between cache array 100 and DRAM array 300, cache array B 200 may transfer data to or from I/O driver 400, and vice versa. Therefore, cache array A 100 and cache array B 200 can be configured to form a pipeline to carry out multiple read or write access commands. It would be apparent to those of ordinary skill in the art that these access commands may be carried out with different number of cache arrays without departing from the scope of the present invention.

Access controller 500 may also include a refresh control circuit which sends control signals to DRAM array 300 periodically to perform refresh operations without intervention by the external device. Further, refresh operations in BT-DRAM system 1000 is carried out completely independent from the access commands.

Figure 2:
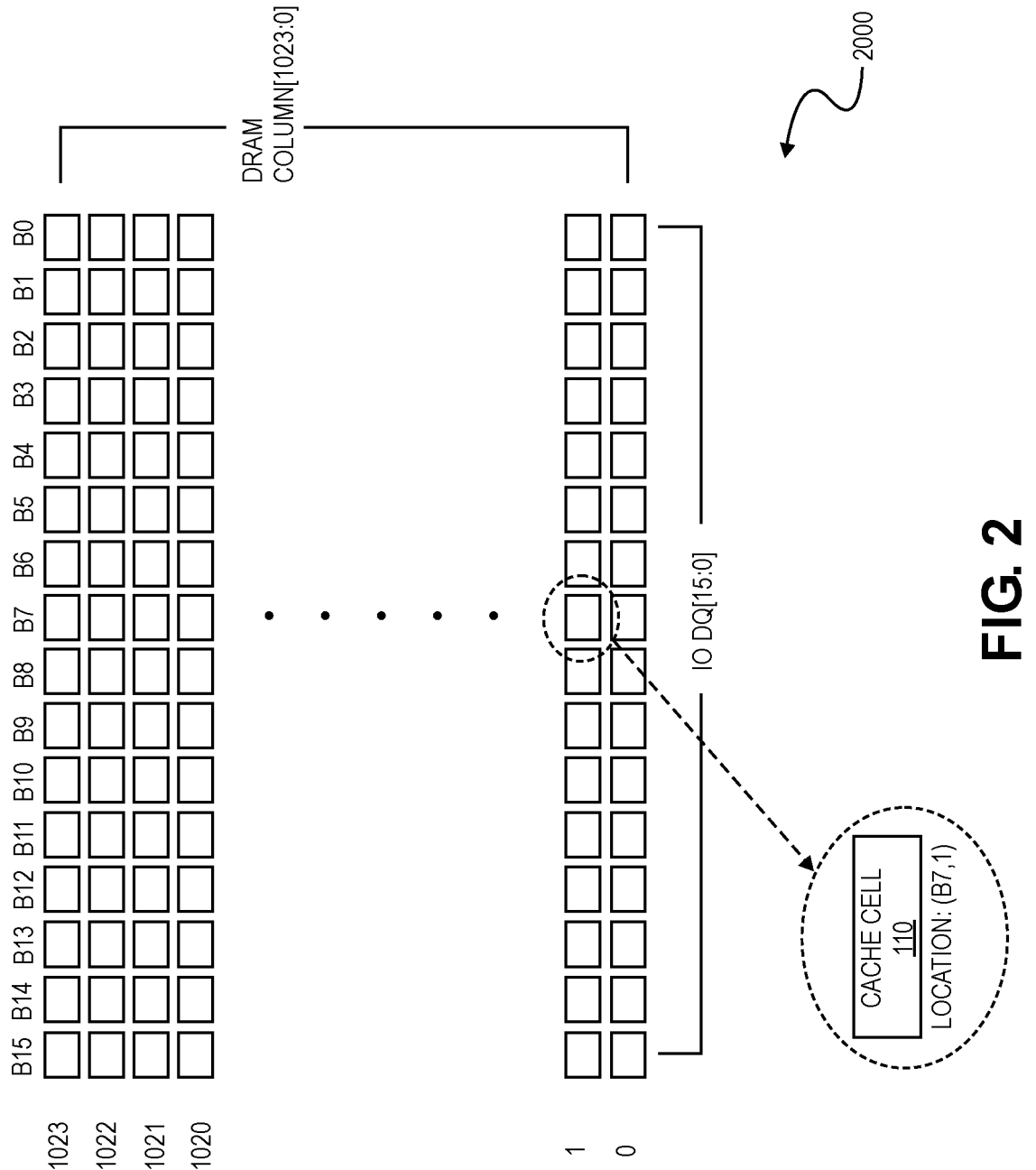
FIG. 2 illustrates structure 2000 in one implementation of a cache array, in accordance with one embodiment of the present invention.

FIG. 2 illustrates structure 2000 in one implementation of a cache array (e.g., cache array A 100 or cache array B 200), in accordance with one embodiment of the present invention. As shown in FIG. 2, The cache array contains a plurality of cache cells 110, which are logically arranged to 1024 rows by 16 columns. The cache array has a capacity to store 8 data blocks. When carrying out an access command, each row of cache cells—addressable as one of 1024 rows—provides a memory word. In one embodiment, the lower 10 bits of an external address associated with an access command may decoded to select a row of cache cells. For a memory array access operation, the DRAM array may transfer 1024 bits to or from a column of cache cells, corresponding to 1024 bit-lines providing an internal word of the DRAM array (e.g., DRAM array 300). Thus, the 16 columns of cache cells may be routed to or from 16 internal words of the DRAM array, with each bit of the internal word corresponding to a respective bit-line in one of 16 sub-arrays of the DRAM array. The cache cell at location (B7, 1), row 1 of column B7, will be used as an example to illustrate a data path connection between the cache array of structure 2000 and the DRAM array 300 in the following paragraphs. It would be apparent to those of ordinary skill in the art that structure 2000 is merely illustrative. Other suitable organization for a cache array with different row numbers or different column numbers may be built and operated without departing from the scope of the present invention.

Figure 3:
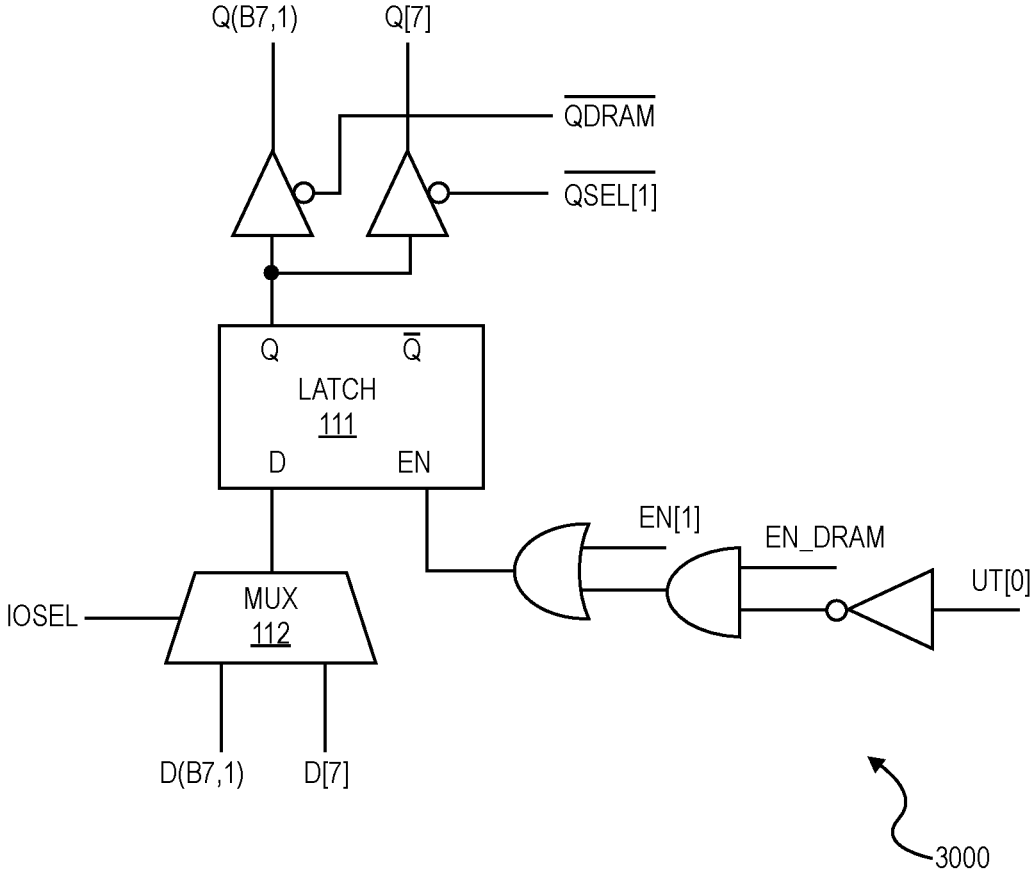
FIG. 3 illustrates cache cell circuit 3000 for implementing a cache cell, in accordance with one embodiment of the present invention.

FIG. 3 illustrates cache cell circuit 3000 for implementing a cache cell (e.g., cache cell 110 of FIG. 2), in accordance with one embodiment of the present invention. As shown in FIG. 3, cache cell circuit 3000 includes D-latch circuit 111 to store a 1-bit datum, which is routed into latch 111 by signal IOSEL at multiplexer 112, from either bit D[7] of 16-bit data paths DQ[0:15] of I/O driver 400 or bit D(B7, 1) of 16 1024-bit data paths from DRAM array 300. The Q data output of latch 111 is selectively output to bit Q[7] of 16-bit data paths DQ[0:15] of I/O driver 400 and bit Q(B7, 1) of 16 1024-bit data paths of DRAM array 300.

In a system with multiple cache arrays (e.g., cache array A 100 and cache array B 200 of FIG. 1), corresponding cache cell in each cache array will be connected to the same data paths of the I/O driver and the DRAM array with using tri-state buffers. As shown in FIG. 3, tristate buffers are provided at output Q of latch 111 and are controlled by signals QSEL[1] and QDRAM respectively.

As shown in FIG. 3, to save a 1-bit datum into latch 111 from the data bus of I/O driver 400, signal IOSEL is set to logic high, signal EN_DRAM is set to logic low, and signal EN[1] is provided with a pulse. To save a 1-bit datum from DRAM array 300, signal IOSEL is set to logic low, signal EN[1] is set to logic low and signal EN_DRAM is provided with a pulse.

As cache array A 100 and cache array B 100 can each store 8 data blocks, each of their respective address spaces can be divided to 8 data sections of one data block each. For example, the cache cell at location (B7, 1) is assigned to data section 0. When a data block is transferred from I/O driver 400 and is saved in data section 0, signal UT[0] is set to high. In cache cell circuit 3000, signal UT[0] prevents latch 111 from being updated by out-of-date data from DRAM array 300. Access controller 500 generates two sets of control signals IOSEL, QSEL[1023:0], QDRAM, EN[1023:0], EN_DRAM and UT[7:0], one set for controlling operations in cache array A 100, while the other set is provided to control the operations of cache array B 200. To distinguish between cache array A 100 and cache array B 200, 8-bit signal UT[7:0] in the control signal set for cache array A 100 will be labeled UTA[7:0] in the following paragraphs, while 8-bit signal UT[7:0] in the control signal set for controlling cache array B 200 will be labeled UTB[7:0] in the following paragraphs. It will be apparent to those of ordinary skill in the art, other suitable control circuits may be used to implement a cache cell (e.g., one that includes a flip-flop circuit, or a RS latch circuit) without departing from the scope of the present invention.

Figure 4:
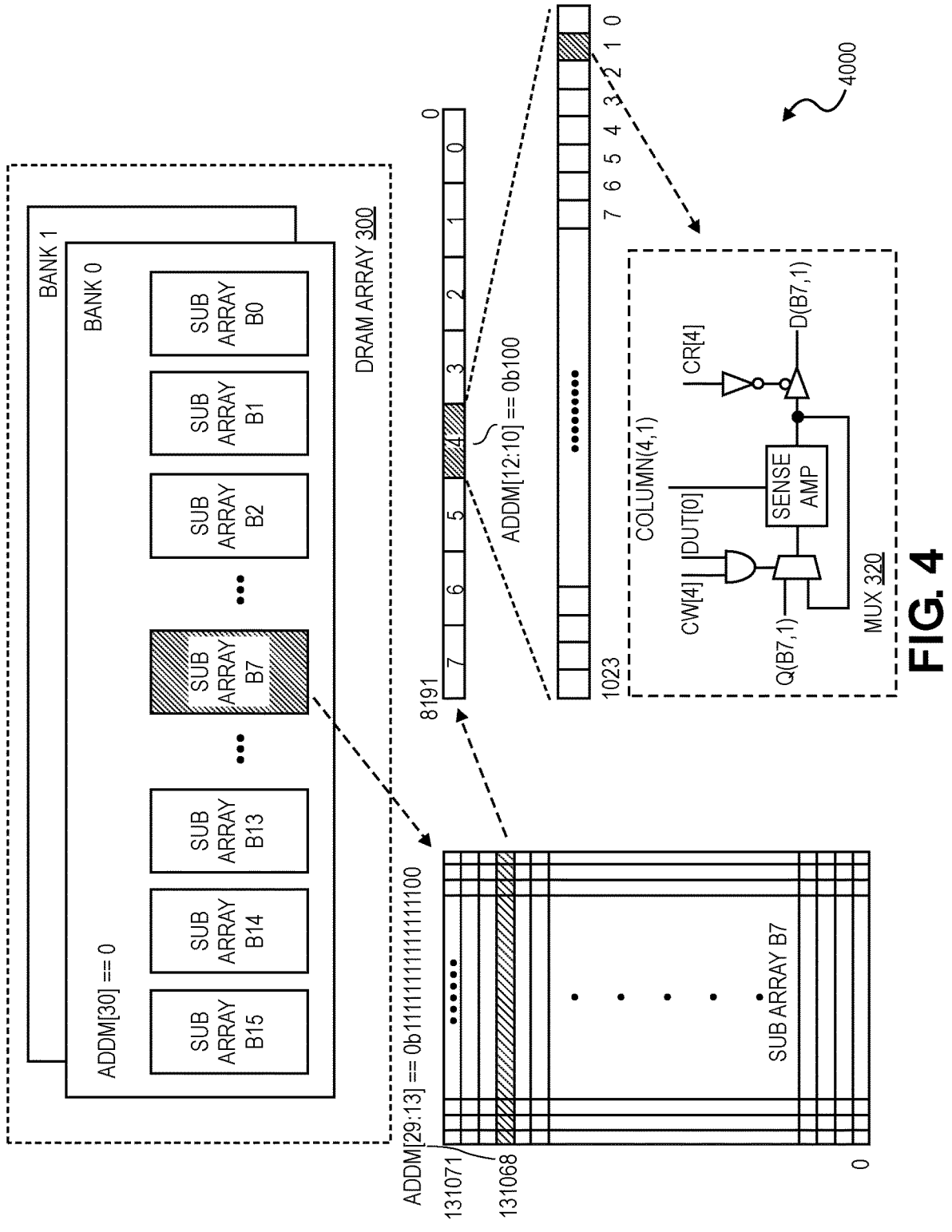
FIG. 4 illustrates an address decoding process in a DRAM array, and operations of its data path circuit 4000, in accordance with one embodiment of the present invention.

FIG. 4 illustrates an address decoding process in a DRAM array (e.g., DRAM array 300), and operations of its data path circuit 4000, in accordance with one embodiment of the present invention, DRAM array 300 of 32 Gb BT-DRAM system 1000 is addressed internally by a 31-bit address ADDM[30:0]. As shown in FIG. 4, DRAM array 300 may be organized into two banks, each bank is formed by 16 subarrays labeled from B0 to B15 respectively. The 16 subarrays simultaneously transfer 16 1024-bit DRAM words between DRAM array 300 and the 16 columns of cache cells in the designated one of the cache arrays. In this detailed description, subarray B7 of FIG. 4 provides an example to illustrate data path connection from one of its bit line, Column(4,1), to the cache cell at location (B7, 1) in the cache array. All other data path connections between a bit line in a subarray and a cache cell in the cache arrays are similarly configured.

Bit ADDM[30] is for selecting one of the two banks in DRAM array 300. For example, when ADDM[30] is logic low, bank 0 is selected for data access. Bits ADDM[29:13] are decoded to select a row of each subarray in the selected bank. For example, the value 0b11111111111111100 in address bits ADDM[29:13] selects row 131048 of each subarray in bank 0 for data access. Bits ADDM[12:10] is for column decoding in each subarray. For example, the value 0b100 in bits ADDM[12:10] selects column 4 of each subarray. The 1024 bit-lines from column 4 are respectively connected to 1024 cache cells in column B7 in the cache array. The bit line 1 in column 4, Column(4,1), is connected to the cache cell at location (B7, 1) in the cache array. When reading from the subarray and column 4 is selected, signal CR[4] is set to logic high, otherwise it is set to logic low. When writing to the subarray and column 4 is selected, signal CW[4] is set to logic high, otherwise it is set to logic low. The signal CW[4] and signal DUT[0] control the multiplexer MUX 320 to select the data input for bit line Column(4,1). When both signal CW[4] and signal DUT[0] are set to logic high, signal Q(B7,1) is written to the bit line Column(4,1). Signals CR[7:0], CW[7:0] and DUT[7:0] are generated by the access controller 500.

Figure 5:
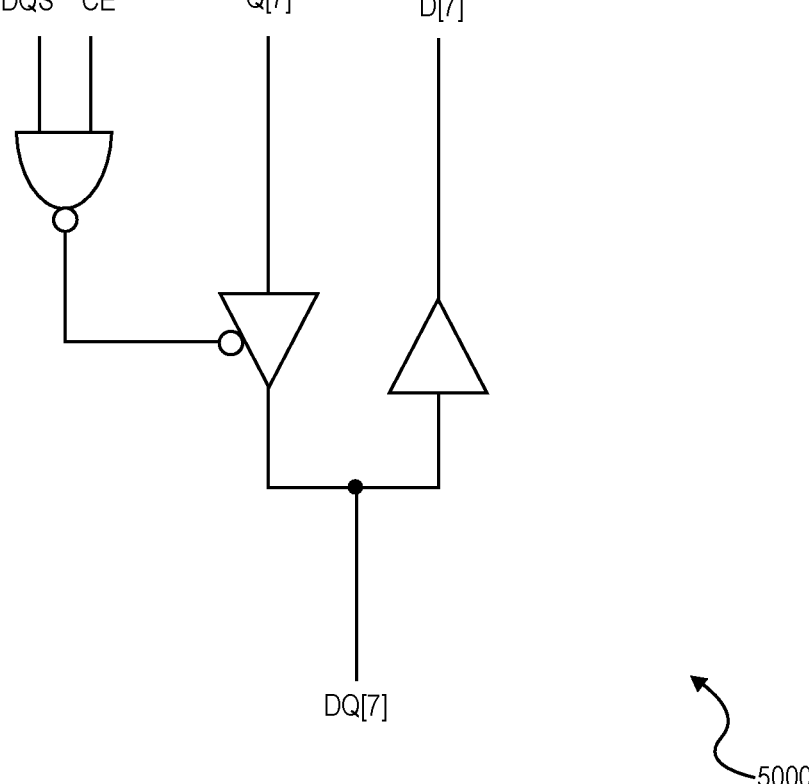
FIG. 5 shows bit DQ[7]—implemented by 1-bit I/O driver circuit 5000—in 16-bit data path DQ[0:15] of a set of I/O drivers, in accordance with one embodiment of the present invention.

FIG. 5 shows bit DQ[7]—implemented by 1-bit I/O driver circuit 5000—in 16-bit data path DQ[0:15] of a set of I/O drivers (e.g., I/O driver 400), in accordance with one embodiment of the present invention. All other I/O driver circuits in I/O driver 400 may be implemented by a similar circuit as circuit 5000. Each of 16-bit data bus DQ[0:15] of I/O driver circuit 4000 is coupled to corresponding cache cells of cache array A 100 and cache array B 200. As shown in FIG. 5, control signal CE—derived from an access command of the external device—and control signal DQS from access controller 500 synchronize data output of each data path bit (e.g., DQ[7]). It would be apparent to those of ordinary skill in the art that other suitable circuits and methods may be used to implement the I/O drivers without departing from the scope of the present invention.

Figure 6:
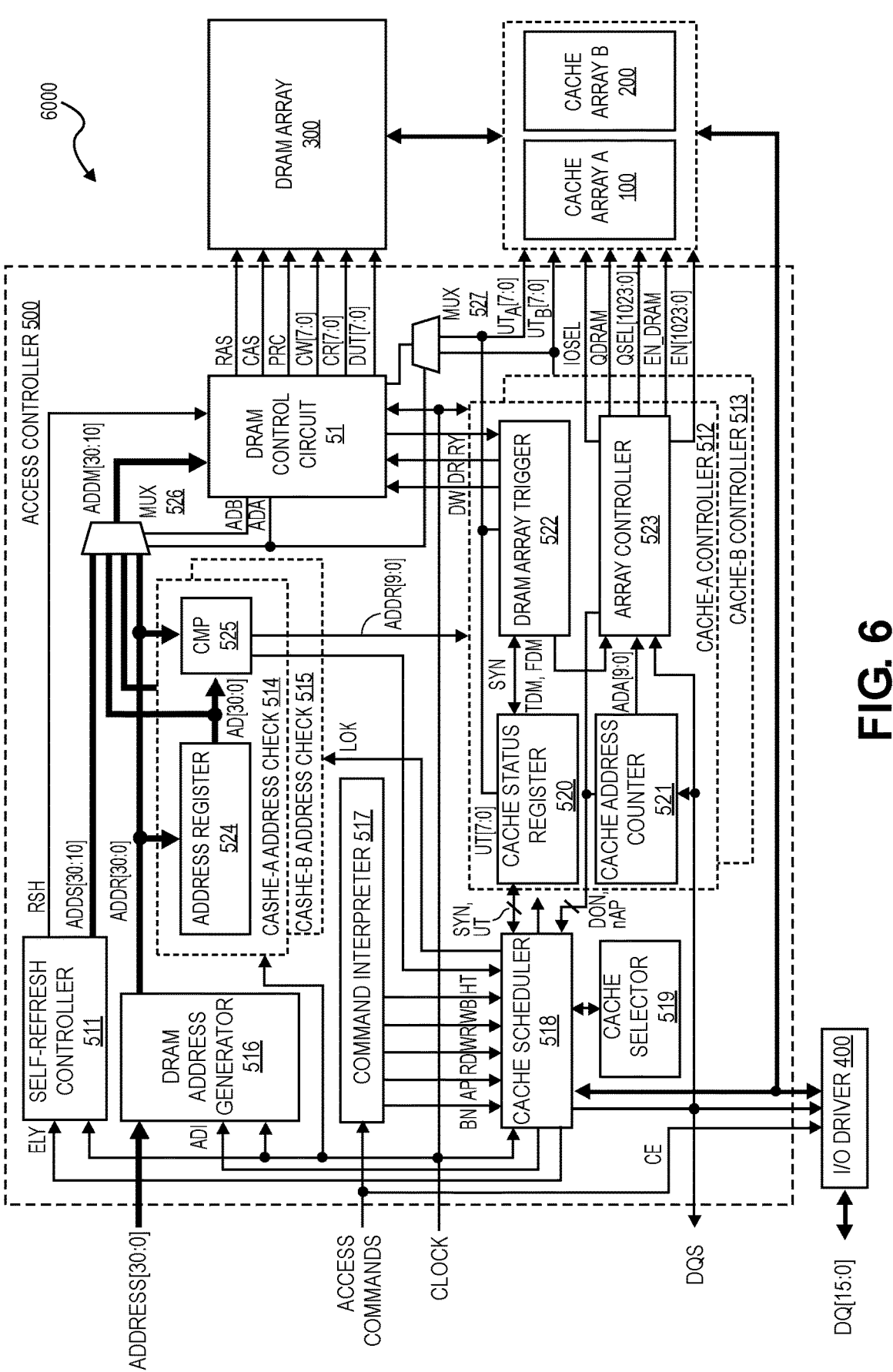
FIG. 6 illustrates access controller circuit 6000, suitable for implementing an access controller, in accordance with one embodiment of the present invention.

FIG. 6 illustrates access controller circuit 6000, suitable for implementing an access controller (e.g., access controller 500), in accordance with one embodiment of the present invention. Access controller circuit 6000 includes DRAM Control Circuit 510, Self-Refresh Controller 511, Cache-A Controller 512, Cache-B Controller 513, Cache-A Address Check 514, Cache-B Address Check 515, DRAM Address Generator 516, Command Interpreter 517, Cache Scheduler 518, Cache Selector 519, multiplexer MUX 526 and multiplexer MUX 527. Cache-A address check circuit 514 and Cache-B address check circuit 515 may be configured identically, each having an address register (labeled Address Register 524 in FIG. 6) and an address comparator (labeled CMP 525 in FIG. 6). Address register 524 records the address of the data block transferred to or from its associated cache array. Cache-A controller 512 and Cache-B controller 513 may be identically configured, each including a cache status register (labeled as Cache Status Register 520), a cache address counter (labeled Cache Address Counter 521), a DRAM array trigger circuit (labeled DRAM Array Trigger 522) and an array controller (labeled Array Controller 523). Cache-A controller 512 and Cache-B controller 513 control the read and write operations of corresponding cache array A 100 and cache array B 200 respectively.

In one embodiment, access commands may include the following commands: BN (for "data block number"), AP (for "address pre-read"), RD (for "read"), WR (for "write"), WB (for "write back") and CE (for "chip enable"). These access commands may be issued individually or grouped as command codes or fields in a single combined access command. The access commands are interpreted by command interpreter 517, which generates the corresponding internal signals to cache scheduler 518 to start an operation.

The BN command sets a value corresponding to the number of data blocks to be transferred in each subsequent access. The value is received from external data input DQ[15:0] and is saved into a loadable 16-bit down-counter in cache scheduler 518. It should be apparent to those of ordinary skill in the art that more than $2^{16}$ blocks may be transferred in each access, and that a counter holding a number greater than $2^{16}$ may be provided without departing from the scope of the present invention.

The AP access command only transfers data blocks from DRAM array 300 to a designated cache array, without sending the transferred data blocks to I/O driver 400 for output. The AP command prepares data for a RD operation to the same address that may follow. The AP command ensures that the data block to be read by the RD command is ready for output from the cache array without latency due to DRAM array access. The AP access command provides improved performance of non-sequential RD operations.

The WB access command instructs one of cache A controller 512 or cache B controller 513 to write back data saved in its corresponding cache array to DRAM array 300, as a synchronization operation.

Access commands may also include a BL (for "data block length") access command to allow configuration of the BT-DRAM system to operate in any of various data block sizes.

In the following paragraphs, only the operations of the Cache-A address check circuit 514 and the Cache-A controller 512 will be described in detail. It will be apparent to those of ordinary skill in the art that similar operations may be carried out in Cache-B address check circuit 515 and the Cache-B controller 513.

When a RD, WR or AP command is received, the 31-bit address associated with the access command (i.e., Address [30:0]) is received into DRAM address generator 516, which provides a corresponding 31-bit internal address ADDR[30:0]. When carrying out a multi-block read (RD) or a multi-block write (WR) access command, once a single-block operation finishes, cache scheduler 518 asserts signal ADI (for "address increment"), which results in DRAM address generator 516 incrementing internal address ADDR[30:0] by 128 to point to the internal address of the next data block. Address comparator 525 then compares internal address ADDR[30:0] with address AD[30:0] saved in address register 524. When address comparator 525 detects a match between ADDR[30:10] and AD[30:10] (i.e., a cache "hit"), signal HT is asserted to signal cache scheduler 518. Whether or not a cache hit is detected, address comparator 525 forwards address bits ADDR[9:0] to the cache controllers.

Cache status register 520 includes 1-bit register which holds a value for signal SYN. Signal SYN indicates a synchronizing status between Cache array A 100 and DRAM array 300. When a data block is transferred from DRAM array 300 to Cache array A 100, signal SYN is asserted (e.g., set to logic high). Cache status register 520 also include 8-bit register UT[7:0], which indicates the update status of the eight data sections of Cache array A 100. When a data block is transferred from I/O drivers 400 to a data section, the corresponding bit, selected by address bits ADDR[9:7], is asserted in register UT[7:0]. A logic OR operation on the bits of register UT[7:0] generates signal UT (i.e., a signal that indicates whether or not there is transferred data from I/O drivers 400 in at least one data section), Signal UT and signal SYN are provided to cache scheduler 518.

Cache selector 519 is a one-bit register that indicates which of cache A controller 512 or Cache B controller 513 is designated to participate in the next access command, a logic low value indicates cache A controller 512 and a logic high value indicates Cache B controller 513. When command interpreter 518 indicates that a RD, WR or AP access command is received, and if signal HT from Cache-A address check circuit 514 is asserted, cache scheduler 518 selects Cache-A controller 512 to carry out the access command, and cache selector 519 is set to logic high.

Otherwise, if signal HT from Cache-B address check circuit 515 is asserted, cache scheduler 518 selects Cache-B controller 513 to carry out the access command, and cache selector 519 is set to logic low. If neither Cache A address check circuit 514 nor Cache B address check circuit 515 asserts its signal HT, cache scheduler 518 selects the cache controller currently designated by the value in cache selector 519 to carry out the current access command, and cache selector 519 is set to the value opposite its current value.

When command interpreter 517 indicates receiving a WR access command, in addition to selecting a cache controller to carry out the access command, cache scheduler 518 also asserts a LOK signal to the corresponding cache address check circuit to save address ADDR[30:0] as AD[30:0] in its address register. If signal UT is asserted from the cache controller of the non-designated cache array ("non-designated cache controller"), cache scheduler 518 initiates a WB operation signal to the non-designated cache controller to carry out a write-back operation. If neither cache address check circuit asserts its signal HT, and if the SYN signal received from the designated cache controller is logic high, the cache scheduler 518 resets the SYN register in the designated cache controller to logic low.

When command interpreter 517 indicates receiving a WB access command, cache scheduler 518 initiates a WB operation in any of Cache A controller 512 and Cache B controller 513 that asserts its signal UT.

When command interpreter 517 indicates receiving an AP access command, and if (i) signal HT is asserted in the cache address check circuit of a cache array, but signal SYN from the corresponding cache controller is logic low, or (ii) neither cache address check circuit asserts its signal HT, cache scheduler 518 initiates an AP operation in the designated cache controller, resets signal SYN in the designated cache controller to logic low, and asserts signal LOK to cause the corresponding cache address check circuit to save address ADDR[30:0] as saved address AD[30:0] in the corresponding address register. If signal UT from the non-designated cache controller is asserted, cache scheduler 518 initiates a WB operation in the non-designated cache controller to carry out a write-back operation.

When command interpreter 517 indicates receiving a RD access command, if signal HT is asserted in the cache address check circuit of the designated cache array and signal SYN signal is logic high at the corresponding cache controller, cache scheduler 518 sends a RD operation signal to the designated cache controller. However, if (i) signal HT from the cache address check circuit of the designated cache controller is asserted, but signal SYN from the designated cache controller is logic low, or (ii) if neither cache address check circuit asserts its signal HT, cache scheduler 518 initiates an AP operation at the designated cache controller, resets signal SYN in that cache controller to logic low, and de-asserts signal DQS through a tri-state buffer until signal DON is asserted at the designated cache controller. Upon detecting signal DON from the designated cache controller, cache scheduler 518 initiates a RD operation in the designated cache controller. If the non-designated cache controller asserts its signal UT, cache scheduler 518 initiates a WB operation in the non-designated cache controller to carry out a write-back operation.

In the following paragraphs, only the operations on cache array A 100 will be described in detail. It will be apparent to those of ordinary skill in the art that similar operations may be carried out in cache array B 200 without departing from the scope of the present invention.

Address counter 521 is a loadable 10-bits counter. During a WR or RD operation, Cache-A controller 512 loads signal ADDR[9:7] to the most-significant 3 bits of address counter 521, sets the rest of the other bits to '0', then enables counting on the external clock signal. Address counter 521 delivers 128 row-addresses of the cache array to array controller 523 during 128 cycles of the external clock signal. Address counter 521 also receives signal DQS which, when de-asserted (i.e., set to logic low), causes address counter 521 to pauses its count.

During a WR operation, Cache-A controller 512 decodes address bits ADDR[9:7] to assert the corresponding bit in register UT[7:0], and array controller 523 sets signal IOSEL, QDRAM, QSEL[1023:0] to logic high and sets signal EN_DRAM to logic low. Concurrently, address counter 521 is enabled to generate a row address for each row of a data block (i.e., row address ADA[9:0]) in each clock cycle to array controller 523. Array controller 523 decodes row address ADA[9:0], which activates one of signals EN[1023:0] to enable one row of the cache array to receive a 16-bit memory word from I/O driver 400. After 128 clock cycles, a data block is completely transferred from I/O driver 400 to the cache array, whereupon address counter 521 pauses and asserts signal DON to the cache scheduler 518. If any bit of the 16-bits down counter in the cache scheduler 518 is logic high, the 16-bits down counter decrements by 1, after that, if any bit of the 16-bits down counter is logic high, the cache scheduler 518 asserts ADI signal to the DRAM address generator 516 and initiates a second WR operation to receive the next data block.

During a WB operation, Cache-A controller 512 enables the DRAM array trigger 522 to assert TDM signal to the array controller 523. Then the array controller 523 sets signal QDRAM, IOSEL, EN[1023:0] to logic low, and sets QSEL[1023:0] to logic high. The Q outputs of all the latches in the cache array A are routed to DRAM array 300. The DRAM array trigger 522 asserts DW signal to the DRAM control circuit 510. When signal SYN from cache status register 520 is de-asserted (i.e., at logic low), the DRAM array trigger 522 also asserts DR signal to the DRAM control circuit 510. Signal DW or signal DR, when asserted, cause the DRAM control circuit 510 to carry out a reading operation on the DRAM array 300. When the reading operation finishes, the DRAM control circuit 510 asserts signal RY, which causes DRAM array trigger 522 to reset all the bits of register UT[7:0] to logic low. If the value of signal SYN received from the cache status register 520 is de-asserted (i.e., at logic low), DRAM array trigger circuit 522 asserts signals SYN and FDM, whereupon array controller 523 (i) asserts pulse signal EN_DRAM to enable the latches in cache array A 100 to save the data received from DRAM array 300, (ii) sets QDRAM to logic high, (iii) asserts signal DON to the cache scheduler 518.

During an AP operation, if signal UT is asserted, cache scheduler 518 enables DRAM array trigger circuit 522 to assert signal TDM, which causes array controller 523 to set signal QDRAM, IOSEL, EN[1023:0] to logic low, and to set signal QSEL[1023:0] to logic high. DRAM array trigger circuit 522 then asserts signal DR to the DRAM control circuit 510. If signal UT is asserted, signal DW is also asserted to the DRAM control circuit 510. Signal DR or signal DW, when asserted, cause the DRAM control circuit 510 to carry out a reading operation on the DRAM array 300. When the reading operation finishes, DRAM control circuit 510 asserts signal RY, which causes DRAM array trigger circuit 522 to assert signal FDM, whereupon array controller 523 (i) asserts pulse signal EN_DRAM to enable the latches in cache array A 100 to save data received from DRAM array 300, (ii) sets QDRAM to logic high, (iii) asserts signal DON signal to the cache scheduler 518. DRAM array trigger circuit 522 also asserts signal SYN and resets all the bits of register UT[7:0].

During a RD operation, array controller 523 sets signal IOSEL, QDRAM to logic high and sets signal EN[1023:0], EN_DRAM to logic low. Address counter 521 is enabled to generate a row address (i.e., address ADA[9:0]) for each row of a data block in cache array A 100 in each clock cycle. Array controller 523 decodes the row address ADA[9:0] to enable one of signal QSEL[1023:0] to route a 16-bit word to I/O driver 400. After 64 clock cycles, cache address counter 521 asserts signal nAP to the cache scheduler 518. If any bit of the 16-bits down counter in the cache scheduler 518 is logic high, the 16-bits down counter decrements by 1, after that, if any bit of the 16-bits down counter is logic high, cache scheduler 518 asserts signal ADI to DRAM address generator 516 and initiates an AP operation in parallel for transferring the next data block from the DRAM array 300 to the cache array B 200. After 128 clock cycles, the current data block is completely transferred from cache array A 100 to I/O drivers 400, address counter 521 pauses counting and asserts signal DON. At that time, if any bit of the 16-bits down counter of cache scheduler 518 is logic high, cache scheduler 518 initiates a second RD operation to output the next data block.

Multiplexer MUX 526 selects one of four address buses based on control signals ADA and ADB. The selected address data bus is output as signals ADDM[30:10] at DRAM control circuit 510. When control signal ADA is logic high and control signal ADB is logic low, signal bus AD[30:10] from Cache-A address check circuit 514 is selected. When control signal ADA is logic low and control signal ADB is logic high, signal bus AD[30:10] from Cache-B address check circuit 515 is selected. When signal ADA is logic low and signal ADB is logic low, signal bus ADDS [30:10] from DRAM self-refresh controller 511 is selected. When signal ADA is logic high and signal ADB is logic high, signal bus ADDR[30:10] is selected.

Multiplexer MUX 527 selects for output between the output values of register UT[7:0] of Cache A controller 512 and the output values of register UT[7:0] of Cache B controller 513, according to signal ADA. When signal ADA is logic high, register UT[7:0] of Cache A controller 512 are selected. Otherwise, the output values of register UT[7:0] of Cache B controller 513 are selected. The output values of multiplexer 527 are provided to DRAM control circuit 510.

Upon power-up or upon receiving a reset command, an initialization circuit typically initializes the 16-bit down counter in cache scheduler 518 to 0x0001 and, in both Cache A controller 512 and Cache B controller 513, sets signal SYN and the bits of register UT[7:0] in cache status register 520 to logic low.

When DRAM control circuit 510 detects an asserted signal DW or an asserted signal DR from Cache A controller 512, signal ADA is set to logic high and signal ADB is set to low. When DRAM control circuit 510 detects an asserted signal DW or an asserted signal DR from Cache B controller 513, signal ADA is set to logic low and signal ADB is set to logic high. When the DRAM control circuit 510 detects an asserted signal RSH from the DRAM self-refresh controller 511, signal ADA is set to logic low and signal ADB is set to logic low. DRAM control circuit 510 passes signals received from multiplexer 527 to signal DUT[7:0], except when DRAM control circuit 510 detects an asserted signal RSH from DRAM self-refresh controller 511, whereupon signals ADA and ADB are both set to logic low, and all bits in signals DUT[7:0] are set to logic low. When none of the asserted signal DR, DW or RSH are detected, signals ADA and ADB are both set to logic high.

No access collision should occur at DRAM control circuit 510, as both a WB operation and a DRAM refresh operation are performed at the beginning of the first half of the BT-DRAM system's access cycle, while an AP operation is performed at the beginning of the second half of the BT-DRAM system's access cycle. However, if an access collision occurs, the late-coming access operation can be put into a queue until to wait for the earlier operation to finish.

Bit ADDM[30] of internal address signals ADDM[30:10] selects a bank of DRAM array 300 and bits ADDM[29:13] are decoded to select a row of the subarrays in the bank. When the DRAM control circuit 510 detects an asserted signal DW or an asserted signal DR from the DRAM array trigger 522, it provides signal RAS (for "row address strobe") on the selected row. Signal RAS drives the row's word-line to logic high to connect the storage capacitors of the DRAM cells of the row to their bit-lines. The DRAM control circuit 510 meanwhile activates a signal timer (e.g., a 5-bits counter and a decoder). As mentioned above, the timing parameters CL-RCD-RP of the DRAM array are 18-18-18. Upon activation, the signal timer asserts a control signal every 18 clock cycles. At the first asserted control signal, if an asserted signal DW is detected, bits ADDM[12:10] are decoded to set the corresponding bit of signal CW[7:0] to logic high; if an asserted signal DR is detected, bits ADDM[12:10] are decoded to set the corresponding bit of signal CR[7:0] to logic high. DRAM control circuit 510 also provides signal CAS (for "column address strobe") to DRAM array 300 to connect the sense amplifiers to the bit-lines in DRAM array 300.

When the DRAM control circuit 510 detects the second asserted control signal from the signal timer, DRAM control circuit 510 asserts signal RY. During an AP operation, asserted signal RY indicates that the cache array may now save a data block from DRAM array 300. DRAM control circuit 510 then deactivates signal RAS, sets the bits in CW[7:0] and CR[7:0] to logic low, and asserts signal PRC, which causes DRAM array 300 to switch off the sense amplifiers and to pre-charge the bit lines.

When DRAM control circuit 510 detects the third asserted signal from the signal timer, the signal timer itself is deactivated. DRAM control circuit 510 then checks the queue register to allow any waiting operation to proceed. When DRAM control circuit 510 detects an asserted signal RSH, it initiates a refresh operation that is similar to the access operations described above, except that DRAM control circuit 510 does not assert signal RY. It should be apparent to those of ordinary skill in the art, that the description of operations in DRAM array 300 is merely illustrative. Other timing schemes with parameters CL-RCD-RP different than 18-18-18 or a different signal timer, may be provided without departing from the scope of the present invention.

As DRAM array 300 is organized into 2 banks, with subarrays in each bank having 128K rows, self-refresh controller 511 refreshes 256K rows in a complete refresh period. If each row requires a refresh interval of less than 64 ms, a refresh operational interval between adjacent rows is 244.14 ns, or 325.5 clock cycles for a 0.75 ns per cycle external clock signal.

Self-refresh controller 511 includes an 8-bit counter for counting input clock cycles. The eight output bits of the counter may be logical AND-ed to generate signal RSH.

Self-refresh controller 511 may also include a 21-bit counter to count signal RSH. The count value of the counter may be used to set address bus ADDS[30:10]. Therefore, every 256 clock cycles, self-refresh controller 511 may initiate a refresh operation by providing signal RSH and a refresh row address to DRAM control circuit 510. At the start of a WR operation, cache scheduler 518 may assert signal ELY (for "early"), which causes self-refresh controller 511 to determine if either of the most-significant two bits of the 8-bits counter's count value is logic high. If so, a refresh operation is immediately initiated, and signal SKIP is asserted and is hold in a 1-bit register. At the next generated signal RSH, if signal SKIP is still asserted, a refresh operation is not initiated by not providing signal RSH to DRAM control circuit 510, but signal SKIP is reset (e.g., set to logic low). Upon power-up or upon receiving a reset command, signal SKIP is reset.

As a BT-DRAM system of the present invention adopts a cache array write-back policy, no access collision can occur between a WB operation and a DRAM refresh operation. As described herein, DRAM array 300 has an 18-18-18 timing parameter, which provides an access cycle time of 54 clock cycles for DRAM array 300. With a data block size of 128 memory words, it requires 128 clock cycles to transfer a data block between a cache array and the I/O driver 400. When one of the cache arrays is transferring a data block to or from I/O driver 400, the other cache array may exchange data to or from DRAM array 300 in parallel. During the 128 clock cycles, two operations may be performed within DRAM array 300. There is always an available time slot for a BT-DRAM system to perform a self-refresh operation without interfering with an I/O read or write operation.

It will be apparent to those of ordinary skill in the art, that additional cache arrays may be incorporated into a BT-DRAM system of the present invention. The additional caches may allow additional pre-reading of data blocks from DRAM array 300, or additional storage of data blocks from I/O driver 400. These additional cache arrays can be controlled and operated without departing from the scope of the present invention.

Figure 7:
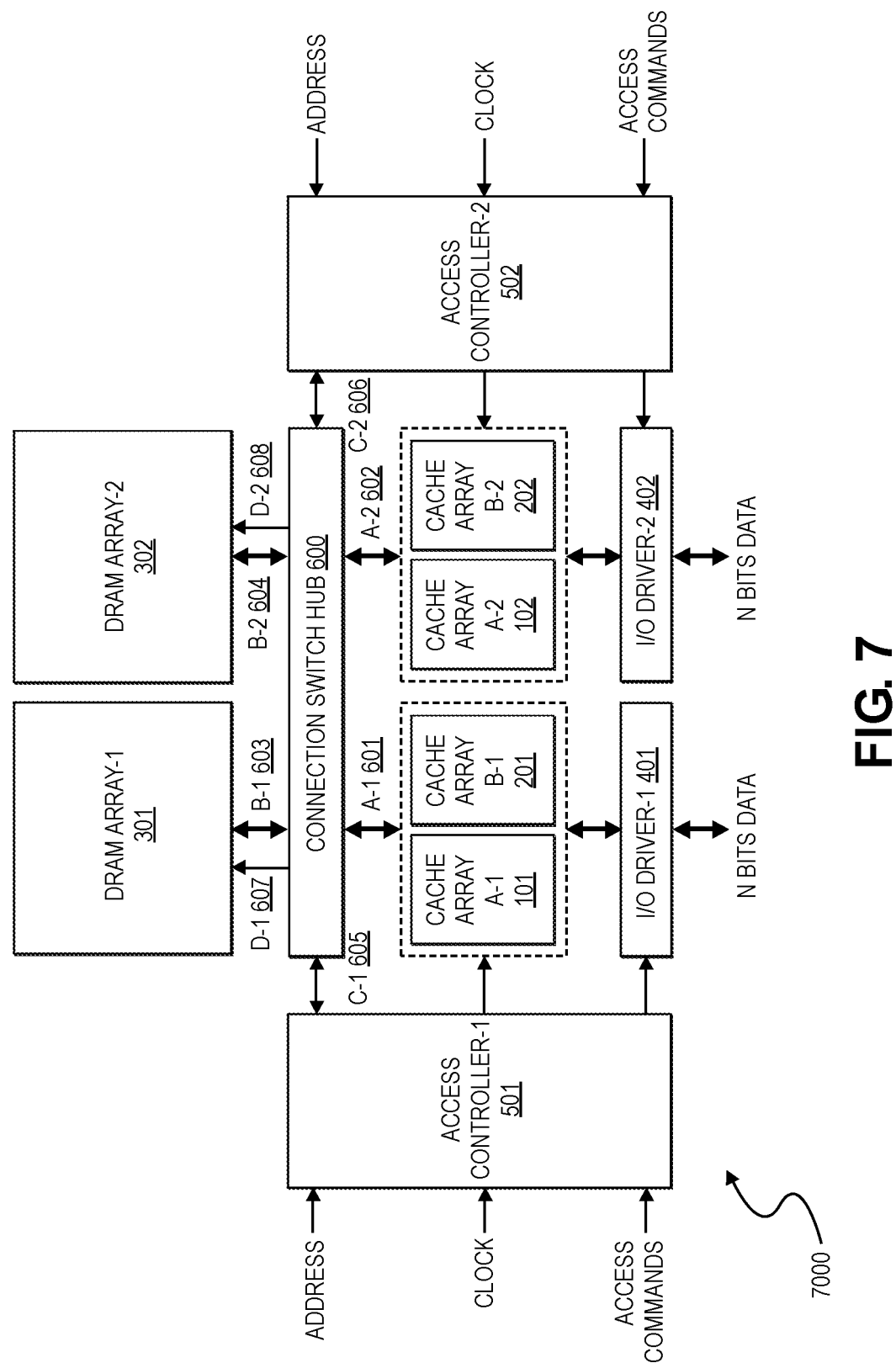
FIG. 7 illustrates BT-DRAM system 7000 with dual-port access, in accordance with one embodiment of the present invention.

FIG. 7 illustrates BT-DRAM system 7000 with dual-port access in accordance with one embodiment of the present invention. BT-DRAM system 7000 may include two copies of BT-DRAM system 1000 of FIG. 1 integrated together by connection switch hub 600. Connection switch hub 600 may include a multiplexer array or a tri-state buffer array, and a switch register that can be set or reset through external access commands. Connection switch hub 600 may have two connection modes. In the first mode ("straight connection mode"), control bus C-1 605 is connected to control bus D-1 607, data bus A-1 601 is connected to data bus B-1 603, control bus C-2 606 is connected to control bus D-2 608, and data bus A-2 602 is connected to data bus B-2 604. In the second mode ("cross connection mode"), control bus C-1 605 is connected to control bus D-2 608, data bus A-1 601 is connected to data bus B-2 604, control bus C-2 606 is connected to control bus D-1 607, data bus A-2 602 is connected to data bus B-1 603. In either mode, the two component BT-DRAM systems in BT-DRAM system 7000 may work independently. Dual-port BT-DRAM system enables two external processors exchange large amount of data without transferring data between them over a data bus. It should be apparent to those of ordinary skill in the art that a multi-port BT-DRAM system may be implemented and operated substantially as described with respect to BT-DRAM system 1000 above without departing from the scope of the present invention.

In this detailed description, various embodiments or examples of the present invention may be implemented in numerous ways. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A block data transfer memory system having a system interface receiving access commands from an external processor and operated by a clock signal being a clock signal of the external processor, comprising:

two cache arrays, comprising a first cache array and a second cache array, each configured to hold one or more data blocks, each data block having a block size comprising a predetermined number of data words;

an input/output circuit configured for transferring a data block between a designated one of the cache arrays and the external processor through the system interface in a system transfer operation, wherein in the system transfer operation, the input/output circuit transfers the data block to the system interface in units of data words at a rate of one data word per cycle of the clock signal;

a memory array configured for storing a plurality of data blocks, the memory array further configured for transferring one or more data blocks in units of the block size between the memory array and either one of the cache arrays in a memory transfer operation, each data block being transferred within an access time of the memory array; and an access controller configured for receiving access commands from the external processor and controlling both system transfer operations and memory transfer operations, wherein the access controller is configured to: (i) designate the first cache array to carry out a first plurality of system transfer operations to transfer data words of one data block and, using the input/output circuit, transfer the data words of the one data block from the first cache array to the external processor through the system interface during the first plurality of system transfer operations; and (ii) simultaneously with the first plurality of system transfer operations, designate the second cache array to carry out a memory transfer operation and transfer a data block between the memory array and the second cache array within the access time of the memory array, wherein the first plurality of system transfer operations has a duration greater than the access time of the memory array.

2. The memory system of claim 1, wherein the predetermined number is a parameter that is configured by the external processor using the access commands over the system interface.

3. The memory system of claim 1, wherein the memory array a plurality of banks, each bank comprising a plurality of subarrays of memory cells, with subarrays in the same bank being configured to participate in a memory transfer operation simultaneously.

4. The memory system of claim 1, wherein each cache array is configured as one or more 2-dimensional arrays of storage cells, each 2-dimensional array is organized into rows and columns, wherein the number of rows in each cache array equals the predetermined number and the number of columns in each cache array equals the bus width of a word.

5. The memory system of claim 4, wherein each 2-dimensional array forms a data section configured to provide a data block from the one or more data blocks in one of the system transfer operations independently of other data sections.

6. The memory system of claim 1, wherein the access controller further a refresh control circuit for carrying out refresh operations in the memory array without participation by an external agent over the system interface.

7. The memory system of claim 1, wherein the access controller configures the two cache arrays into a pipeline for carrying out successive system transfer operations involving multiple data blocks.

8. The memory system of claim 1, wherein the memory system includes more than two cache arrays, such that more data blocks at independent addresses can be transferred and stored in the cache arrays.

9. The memory system of claim 1, wherein the access controller implements in each of the cache arrays a write-back policy in which a data block transferred into the cache array by system transfer operations is transferred into the memory array by a memory transfer operation initiated by the access controller.

* * * * *